June 5, 1951          E. E. SHELDON          2,555,423
IMAGE INTENSIFYING TUBE
Filed April 16, 1947
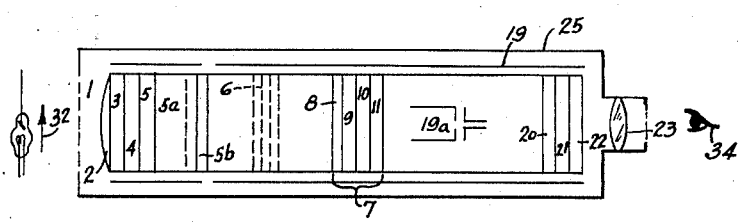
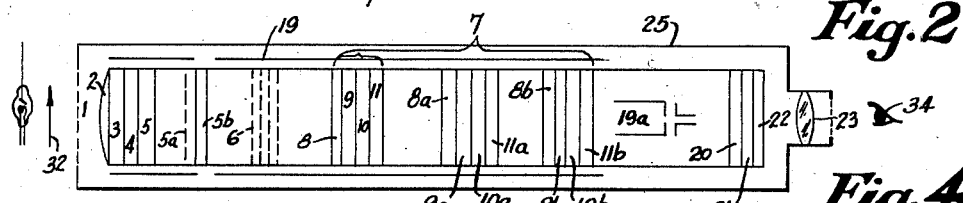
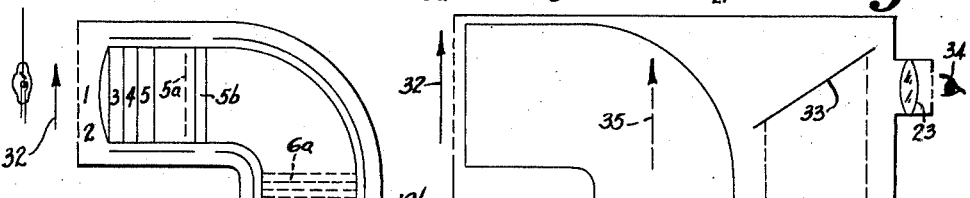
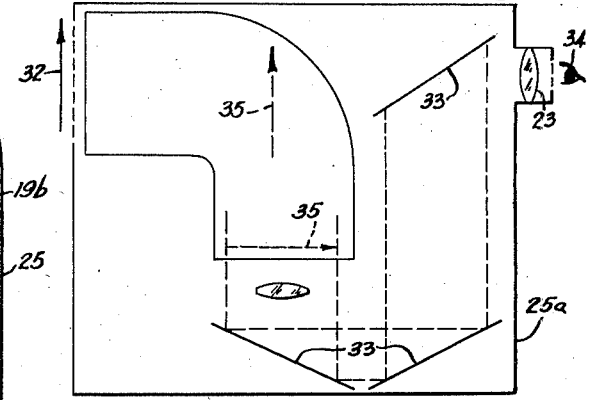
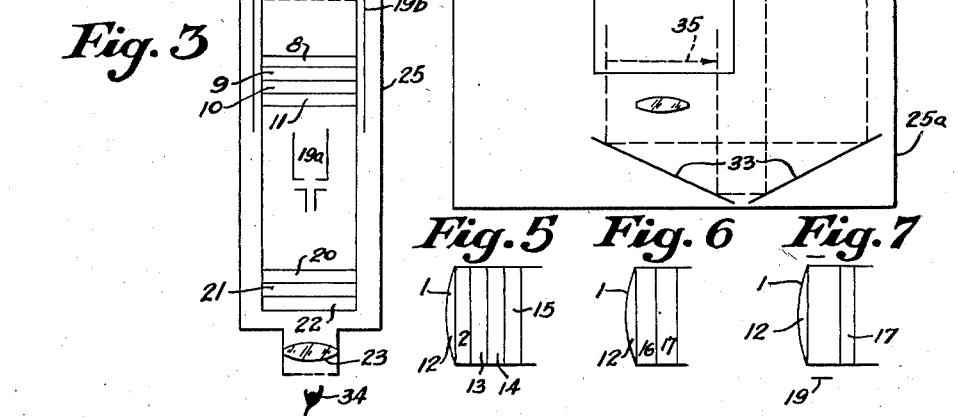
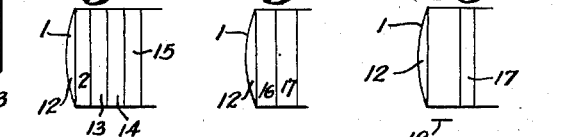
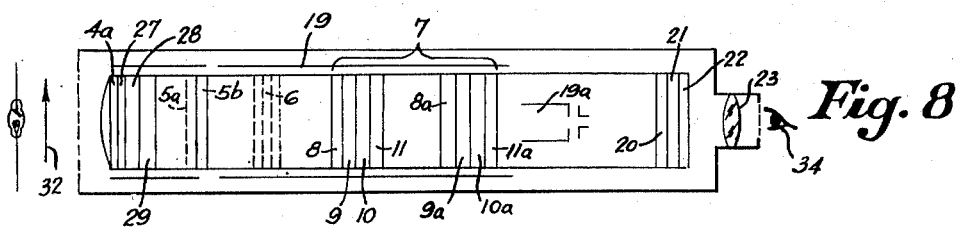
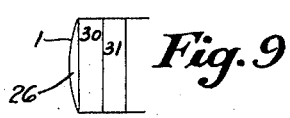
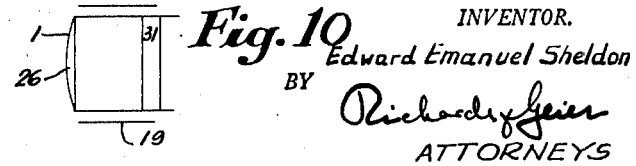
INVENTOR.
Edward Emanuel Sheldon
BY
ATTORNEYS

Patented June 5, 1951

2,555,423

UNITED STATES PATENT OFFICE 2,555,423

IMAGE INTENSIFYING TUBE

Edward Emanuel Sheldon, New York, N. Y.

Application April 16, 1947, Serial No. 741,803

7 Claims. (Cl. 313—101)

This invention relates to an improved method and device of intensifying images and refers more particularly to an improved method and device for intensifying images formed by the impingement of X-rays (which term is meant to include other invisible radiations such as gamma rays and the like, and also irradiation by beams of atom particles such as e. g. neutrons) on a fluorescent or other reactive screen.

One primary object of this invention is to provide a method and device to produce intensified images. This intensification will enable to overcome the inefficiency of the present fluoroscopic examinations. At the present level of illumination of the fluoroscopic image the human eye has to rely exclusively on scotopic (dark adaptation) vision, which is characterized by a tremendous loss of normal visual acuity in reference both to detail and to the contrast.

Another object of this invention is to make it possible to prolong the fluoroscopic examination since it will reduce markedly the strength of radiation affecting the patient's body. Conversely, the exposure time or energy necessary for the radiography may be reduced.

Another object is to provide a method and device to produce sharper fluoroscopic and radiographic images than was possible until now.

The present intensifying devices concerned with reproduction of X-ray fluoroscopic images were completely unsatisfactory, as in the best of them amplification of the original image brightness of the order of 3 to 5 was achieved, while in order to obtain improvement in the visual acuity intensification of the brightness of the order of 1000 is obligatory. Without intensification of luminosity of at least of the order of 1000 the eye is confined to so-called scotopic vision at which it is not able to perceive definition and contrast of the fluoroscopic image. It is well known that intensification of the brightness of the X-ray fluoroscopic image can not be achieved by increase of energy of the X-ray radiation as it will result in damage to the patient's tissues. Therefore, to obtain the objects of this invention a special X-ray sensitive image tube had to be designed, Fig. 1. This novel X-ray image tube is characterized by elimination of the optical lens system present in other image tubes which resulted in 20–30 fold gain in the light reaching the photocathode. This gain of incident light on photocathode allowed to activate the intensifying system, which before was impossible as with the amount of incident light available after passage through the focussing optical system the signal to noise ratio was too low for satisfactory results. Then by the combined use of a novel photoemissive pick-up system and storage system of the tube (1, 2, 3, 4, 5, 5a, 5b) of a multiplier section of the tube 6 of a novel electron image amplifier system 7 of the electronic acceleration and of the electronic image diminution the intensification of the luminosity of the original image exceeding the ratio of 1000–1 was accomplished.

The elimination of the optical system present in other image tubes to focus the fluorescent image on the photocathode of the tube was accomplished by positioning within the X-ray sensitive image tube of the screen, consisting of combination of X-ray transparent, light reflecting layer 2 of X-ray fluorescent, or reactive layer 3, and of the photoemissive layer 5. All layers are placed in close apposition to each other to prevent loss of definition. The fluorescent and photoemissive layers are separated only by a very thin light transparent, chemically inactive, barrier layer 4. The previous combinations of fluorescent and photoemissive layers were not successful because of detrimental chemical interaction of both layers, due to lack of a barrier between them, therefore the introduction of light transparent barrier layer represents a very important part of this invention. Further, the photoemissive pick-up section was designed to improve its efficiency. The previous image tubes used photoemissive layers of an insulated mosaic type. In my tube the insulating mosaic is replaced with the photoemissive layer of semi-transparent type. This layer is characterized by emission of electrons on the side opposite to the side of the incident light. The photoelectrons emitted from the photoemissive layer in a pattern corresponding to the incident light pattern are focussed by means of magnetic and/or electric fields on the target (5a—5b) which serves as a secondary emission electrode and electron storage place. This division of the photo surface into photoemissive section and secondary emission-storage section allows to obtain many-fold gain in efficiency as compared with the mosaic type of photo-emissive surfaces where both photo-emissive action and storage action are combined in one layer. In other cases in order to increase further the efficiency of this system the electron-emissive effect and storage effect are separated from each other by using one special plate for electron emission and another one for electron storage. In some cases it may be desirable to use a cooling system for a photocathode and secondary emission electrode to inhibit thermionic emission.

The fluorescent layer, the photocathode and the secondary emission and storage electrode represent the pick-up section of the X-ray sensitive image tube. The electron image stored in the storage electrode is removed from it after a desired time by the action of an intermittent high voltage field. In some cases it may be preferable, however, for simplification of design to use the photo-emissive cathode with a secondary emission electrode without a storage system.

Further intensification of the X-ray image was obtained by the use of novel image amplification system.

The amplification section of the tube 7 consists of one or a few screens each of them composed of a very thin light-reflecting, electron pervious layer 8 of fluorescent layer 9 and of photo emissive layer 11 in close apposition to each other. It is necessary to include a thin light transparent, chemically inactive barrier layer between the fluorescent and photo-emissive layers 10 in order to prevent their chemical interaction. The electrons from the pick-up section of the image tube are focussed by magnetic or electrostatic fields on the fluorescent layer of a screen described above. The luminescence of the fluorescent layer of the amplification screen will cause the emission from the photo-emissive layer of the screen. This process can be repeated a few times, using a few screens described above resulting in 10-100 times intensification of the original electron image (Fig. 2).

In another variety to be used in this invention there is an additional multiplier section 6 which consists of a few stages of grid multipliers and by its design (Figs. 1-6 and Figs. 3-6a) can give an additional intensification of the electron image.

The electrons leaving the amplifying section are accelerated by means of high voltage electrostatic fields. The accelerating system can be of a conventional type well known in the art. Much better results with higher voltages will be achieved with an electrostatic multi-lens system 19a.

Next the electron image is demagnified which results in its additional intensification. The electron diminution of the image, in order to gain its intensification is well known in the art, therefore does not have to be described in detail.

The diminished electron image is projected on the fluorescent screen at the end of the tube 21 where it can be viewed by the observer directly or by means of an optical magnifying eye piece 23, through the light transparent end wall of the tube 22.

The use of an optical eye piece to magnify optically the electronically diminished image appearing on the fluorescent screen, is also well known in the art, therefore does not need further description.

The combination of the above described features of the X-ray sensitive image tube allows to obtain intensification of the original X-ray image exceeding the necessary ratio of 1000-1 which was the primary objective of this invention. Having such a marked intensification of the original X-ray image it will be possible now to use a much finer grain of fluorescent screens 3 and 21 than was practical until now and to improve in this way detail and contrast of the final image, which was another purpose of this invention.

There are known in the art X-ray image tubes which have the feature of elimination of the optical focussing system. These tubes, however, rely for intensification completely on the electron acceleration. It is well known that the intensification of the electron image by acceleration can not be used beyond 20 kv. because of unavoidable ion emission from different parts of the tube, because of field emission and also because of electron optical complications at the high voltage. 20 kv. acceleration results in only ten fold intensification of the original image, whereas for the purposes outlined above thousand fold intensification is necessary. It is obvious, therefore, that the use of a novel pick-up section consisting of separate photo-emissive and storage layers and of novel cascade amplification system represents an invention without which the intensifying X-ray image tube could not operate.

The invention will appear more clearly from the following detailed description when taken in connection with the accompanying drawings by way of example only, preferred embodiments of the inventive idea.

The face 1 of the image tube must be of a material transparent to the type of radiation to be used. Inside of the face of the tube there is a very thin light reflecting aluminum layer 2 which prevents the loss of light from the fluorescent screen 3. An extremely thin barrier layer 4 separates the fluorescent screen 3 from the photo-emissive layer 5. The fluorescent 3 and photo-emissive layers 5 should be correlated so that under the influence of the particular radiation used there is obtained a maximum output of photo-emission. More particularly the fluorescent screen should be composed of a material having its greatest sensitivity to the type of radiation to be used, and the photo-emissive material likewise should have its maximum sensitivity to the wave length emitted by the fluorescent screen. Fluorescent substances that may be used are willemite, or other zinc silicates, zinc selenides, zinc sulphide, calcium fluoride or calcium tungstate, with or without activators. Activators depend also on the type of radiation to be used. For short wave radiation Ag and Cd are very efficient. For long wave radiation Ce or Sa are the best activators for selenides and Pb or Cu for sulphides. The satisfactory photo-emissive materials will be caesium oxide, caesium oxide activated by silver, caesium with antimony, with bismuth or arsenic or antimony, with lithium or potassium. The barrier layer 4 between the fluorescent and photo-emissive surfaces can be an exceedingly thin, e. g. of a thickness of the order of 0.15-0.20 millimeter, transparent film of mica, glass, of organic substance such as nitrocellulose or gelatine, of silicon or of a suitable plastic.

The electron image obtained on the photo-emissive layer 5 is now projected on the secondary emission of target 5a—5b by means of magnetic and/or electrostatic field. The stored electron image can be released by the intermittent action of high voltage field.

The electron image obtained in the pick-up section is now transferred to the first screen of the amplifying section 7 by means of focussing magnetic or electrostatic field which is not indicated, since it is well known in the art and would only serve to complicate the illustration.

The amplifying section 7 uses one or a few successively arranged special screens (Fig. 2) each of them consisting of electron pervious, light-reflecting layer 8, of fluorescent layer 9, of light transparent barrier layer 10 and of photo-emissive layer 11. Fluorescent substances that may be used are willemite or other zinc silicates, zinc selenides, zinc sulphide, calcium fluoride or calcium tungstate with or without activators. The satisfactory photo-emissive materials will be caesium oxide, caesium oxide activated by silver, caesium with antimony, with bismuth or arsenic or antimony with lithium or potassium. The barrier layer 4 between the fluorescent and photo-emissive surfaces can be an exceedingly thin transparent film of mica, glass, of organic substance such as e. g. nitrocellulose or gelatine, of silicon or of a suitable plastic. The amplification achieved by this system results in marked intensification of the original image.

In some applications it may be preferable to use in conjunction with amplifying system the electron multiplier section 6 consisting of one or a few stages of secondary electron multipliers which serves to intensify further the electronic image. In such a case the electron image from the pick-up section of the tube is focussed by means of magnetic field on the first stage of the multiplier section. The secondary electrons from the first stage are focussed the same way on the second stage of the multiplier section and so on.

The electrons emerging from the amplifying section are now accelerated and imaged by means of electro-magnetic fields 19 to the desired velocity, giving thus further intensification of the electron image. Next the electron image is diminished by means of electromagnetic lenses 19a to the desired size, resulting in image intensification proportional to the square power of the linear diminution and is projected through the electron pervious, light reflecting aluminum layer 20 on the fluorescent screen 21 made of fine grains of ZnO, Zn silicates or ZnS with appropriate activators where it can be viewed by observer. In some cases it may be more desirable to have the fluorescent screen mounted outside of the vacuum tube, in such cases thin electron transparent layer of chromium or aluminum is placed on the end wall 22 of the vacuum tube made of fernico glass. The image appearing on the fluorescent screen can be viewed directly or by means of an optical eye-piece 23 giving the desired optical magnification of the image. In other cases the fluorescent screen 21 is substituted by photographic layer or by photographic layer in combination with fluorescent screen permitting thus to obtain a permanent record of electron image.

In another alternative of this invention the tube is curved (Fig. 3) and the electron beam is deflected by proper magnetic fields. This arrangement will prevent the positive ions from reaching the photoemissive section.

A special optical system using a few mirrors (Fig. 4) or a periscopic arrangement of lenses and mirrors 33 is provided to enable the examiner 34 to correlate accurately the intensified image 35 produced by the curved tube with the investigated part of the body 32. The distances between the body and the position of the observer is less than an arm's length so that the examiner may palpate the body while viewing the image. This advantage is important in medical fluoroscopy where the angle of observation of the examined part of the body and of the image must be readily correlated. In many instances it may be found desirable to attach a standard fluorescent screen to the housing 25 containing the X-ray sensitive image tube for obtaining a large survey view of the body prior to or after a detailed examination with the above apparatus.

Alternative of this invention (Fig. 5) consists of using an X-ray reactive layer of electron emitting type 12, such as for example lead or bismuth between the face of the tube and fluorescent layer so that electrons liberated by X-ray radiation from the X-ray reactive layer will excite the suitable adjacent fluorescent layer 13 whose fluorescence will in turn activate the suitable photo-emissive layer 15 through the light transparent barrier layer 14.

In another form of this invention (Fig. 6) the X-ray reactive layer 12 is in close apposition to the secondary electron emissive, e. g. CsO:Cs; Ag:Mg layer 17 separated from it only by the electron pervious chemically inactive barrier layer 16.

In another form of this invention (Fig. 7) the barrier layer is eliminated and the magnetic or electrostatic field is used to focus electron image of the X-ray reactive layer 12 on the electron emissive layer 17.

It is not intended to restrict the scope of this invention to the employment of X-ray or gamma radiations but other corpuscular radiations and suitable reactive layers are intended to be comprehended. Another form of the invention is illustrated in Fig. 8, wherein a neutron reactive layer 26 preferable from the group boron, lithium, gadolinium and uranium or of paraffine is placed on the face of the image tube. The protons or electrons liberated from this layer 26 under the impact of neutron radiation will strike through a thin electron pervious chemically inactive barrier layer 4a a suitable fluorescent layer 27, causing it to fluoresce and activate a suitable photo-emissive layer 29 through the light transparent barrier layer 28. In other cases a neutron reactive layer of copper will be more advantageous, because of its gamma emission.

In some cases it may be more desirable (Fig. 9) to eliminate the fluorescent layer 27 and to cause protons and electrons from the layer 26 to act on electron emissive layer 31 either by apposition (Fig. 9) in which case electron pervious chemically inactive barrier layer 30 has to be used to prevent chemical interaction of adjacent layers or by focussing them with magnetic or electrostatic fields (Fig. 10).

The fluorescent layer to be used in the neutron sensitive tube may be of similar composition as described above in the X-ray sensitive image tube, but it has also to be adapted to respond most efficiently to the radiation emitted from neutron sensitive layer by enriching it with proper additional elements. The photo-emissive layer has again to be correlated with spectral emission of fluorescent layer. The amplifying system, the multiplier system, the accelerating system, the electronic diminution are the same for neutron sensitive image tube and for X-ray sensitive image tube.

All the particular embodiments and forms of this invention have been illustrated and it is understood that modifications may be made by those skilled in the art, without departing from the full scope and spirit of the foregoing disclosure.

What is claimed is:

1. In X-ray image intensifying tubes, an evacuated envelope, containing in combination, a composite photocathode consisting of a fluorescent layer, a light transparent separating layer, adjacent said fluorescent layer and of a thickness less than 0.15 millimeter, and of a photoemissive layer adjacent said transparent layer, accelerating, and focusing means and an electron reactive image reproducing screen spaced apart from said photocathode.

2. In X-ray image tubes, an evacuated envelope containing, in combination, a composite photocathode within said tube, consisting of a light reflecting layer, a fluorescent layer, a thin light transparent separating layer and a photoemissive layer, said light transparent layer placed between said fluorescent layer and said photoemissive layer and of a thickness not exceeding 0.15 millimeter, accelerating and focusing means and an electron reactive image reproducing screen.

3. In a device, as set forth in claim 1, an image amplifying screen spaced between said photocathode and said image reproducing screen and consisting of a light reflecting layer, a fluorescent layer, a thin light transparent separating layer and photoemissive layer, said light transparent separating layer being placed between said fluorescent layer and said photoemissive layer and of a thickness not exceeding 0.15 millimeter.

4. In X-ray image intensifying tubes, a system of amplification consisting of a plurality of composite screens within said envelope spaced apart from each other, each of said screens having a light reflecting layer, a fluorescent layer, a thin light transparent layer and a photoemissive layer, said light transparent layer being placed between said fluorescent layer and said photoemissive layer and of a thickness not exceeding 0.15 millimeter.

5. In X-ray intensifying tubes a composite screen consisting of a fluorescent layer, a light transparent layer and of a photo-emissive layer, said transparent layer being placed between said fluorescent layer and said photoemissive layer, and of a thickness not exceeding 0.15 millimeter.

6. In image intensifying tubes a composite screen consisting of a light reflecting layer, of a fluorescent layer adjacent said reflecting layer, a light transparent layer and of a photoemissive layer, said light transparent layer being placed between said fluorescent layer and said photoemissive layer, being independent of walls of said tube and of a thickness not exceeding 0.15 millimeter.

7. In X-ray image intensifying tubes, an evacuated envelope, containing in combination, a composite photocathode consisting of a fluorescent layer, a light transparent separating layer adjacent said fluorescent layer, of a thickness less than 0.15 millimeter and independent of walls of said envelope, and of a photoemissive layer adjacent said transparent layer, accelerating and focusing means, and an electron reactive image reproducing screen spaced apart from said photocathode.

EDWARD EMANUEL SHELDON.

REFERENCES CITED

The following references are of record in the file of this patent:

UNITED STATES PATENTS

| Number | Name | Date |
| --- | --- | --- |
| 2,158,853 | Coolidge | May 16, 1939 |
| 2,159,568 | Ploke | May 23, 1939 |
| 2,177,360 | Busse | Oct. 24, 1939 |
| 2,198,479 | Langmuir | Apr. 23, 1940 |
| 2,270,373 | Kallmann et al. | Jan. 20, 1942 |
| 2,286,280 | Iams | June 16, 1942 |
| 2,297,478 | Kallmann | Sept. 29, 1942 |
| 2,344,042 | Kallmann et al. | Mar. 14, 1944 |
| 2,344,043 | Kallmann et al. | Mar. 14, 1944 |